United States Patent
Hayles, Jr. et al.

(10) Patent No.: US 8,988,310 B2
(45) Date of Patent: Mar. 24, 2015

(54) SYSTEM AND METHOD FOR HIGHLY DIRECTIONAL ELECTRONIC IDENTIFICATION AND COMMUNICATION AND COMBAT IDENTIFICATION SYSTEM EMPLOYING THE SAME

(71) Applicant: ATR Electronics, SanAntonio, TX (US)

(72) Inventors: Ralph E. Hayles, Jr., San Antonio, TX (US); Thomas H. O'Mara, New Vernon, NJ (US)

(73) Assignee: ATR Electronics Inc., San Antonio, TX (US)

(*) Notice: Subject to any disclaimer, the term of this patent is extended or adjusted under 35 U.S.C. 154(b) by 13 days.

(21) Appl. No.: 13/776,365

(22) Filed: Feb. 25, 2013

(65) Prior Publication Data
US 2015/0048974 A1 Feb. 19, 2015

Related U.S. Application Data

(60) Division of application No. 13/357,493, filed on Jan. 24, 2012, now abandoned, which is a continuation of application No. 13/037,906, filed on Mar. 1, 2011, now Pat. No. 8,115,697, which is a continuation of application No. 12/537,161, filed on Aug. 6, 2009, now Pat. No. 8,378,922, which is a division of application No. 11/339,192, filed on Jan. 25, 2006, now Pat. No. 7,580,004.

(60) Provisional application No. 60/646,549, filed on Jan. 25, 2005.

(51) Int. Cl.
*H01Q 19/06* (2006.01)
*G01S 15/74* (2006.01)
*H01Q 15/00* (2006.01)
*H01Q 15/08* (2006.01)

(52) U.S. Cl.
CPC ............... *H01Q 15/08* (2013.01); *H01Q 19/06* (2013.01)
USPC ........................... 343/911 L; 342/45; 342/11

(58) Field of Classification Search
CPC ...... H01Q 15/08; H01Q 19/062; H01Q 19/06
USPC .................... 342/11, 45; 343/911 L
See application file for complete search history.

(56) References Cited

U.S. PATENT DOCUMENTS

| | | |
|---|---|---|
| 3,543,271 A | 11/1970 | Scheel |
| 4,189,730 A | 2/1980 | Murdock |
| 5,117,240 A | 5/1992 | Anderson et al. |
| 5,183,951 A | 2/1993 | Bilodeau |
| 5,218,360 A | 6/1993 | Goetz et al. |
| 5,307,053 A | 4/1994 | Wills et al. |
| 5,625,368 A | 4/1997 | Howson et al. |
| 5,748,151 A | 5/1998 | Kingston et al. |
| 5,819,164 A | 10/1998 | Sun et al. |
| 5,821,908 A | 10/1998 | Sreenivas |
| 6,169,910 B1 | 1/2001 | Tamil et al. |
| 6,295,455 B1 | 9/2001 | Fischer et al. |

(Continued)

*Primary Examiner* — Robert Karacsony

(57) ABSTRACT

An antenna for directional electronic communication and a directional communication system are provided. In one embodiment, the antenna includes: (1) a protective shell, (2) a Luneberg lens located within the protective shell and (3) multiple radio frequency signal conveyors located proximate a portion of the Luneberg lens and configured with the Luneberg lens to transmit radio frequency signals within a defined region or receive radio frequency signals that originate within the defined region.

12 Claims, 5 Drawing Sheets

(56) References Cited

U.S. PATENT DOCUMENTS

| | | | |
|---|---|---|---|
| 6,380,904 B1 * | 4/2002 | Ogawa | 343/754 |
| 6,424,319 B2 | 7/2002 | Ebling et al. | |
| 6,426,814 B1 | 7/2002 | Berger et al. | |
| 6,437,727 B2 | 8/2002 | Lemelson et al. | |
| 6,462,717 B1 | 10/2002 | Wheelock et al. | |
| 6,538,615 B1 | 3/2003 | Schantz | |
| 6,545,632 B1 | 4/2003 | Lyons et al. | |
| 7,196,655 B1 * | 3/2007 | Hayles et al. | 342/45 |
| 7,573,369 B2 | 8/2009 | Hayles, Jr. et al. | |
| 7,580,004 B1 | 8/2009 | Hayles, Jr. et al. | |
| 8,115,697 B2 * | 2/2012 | Hayles et al. | 343/911 L |
| 8,378,922 B1 | 2/2013 | Hayles, Jr. et al. | |
| 2002/0151309 A1 * | 10/2002 | Johnson et al. | 455/447 |
| 2004/0263418 A1 | 12/2004 | Kuroda et al. | |
| 2012/0122403 A1 | 5/2012 | Hayles, Jr. et al. | |

* cited by examiner

SYSTEM AND METHOD FOR HIGHLY DIRECTIONAL ELECTRONIC IDENTIFICATION AND COMMUNICATION AND COMBAT IDENTIFICATION SYSTEM EMPLOYING THE SAME

CROSS-REFERENCE TO RELATED APPLICATIONS

This application is a divisional of U.S. application Ser. No. 13/357,493 entitled "SYSTEM AND METHOD FOR HIGHLY DIRECTIONAL ELECTRONIC IDENTIFICATION AND COMMUNICATION AND COMBAT IDENTIFICATION SYSTEM EMPLOYING THE SAME," filed on Jan. 24, 2012, by Ralph Hayles, Jr., et al., which is currently pending and is a continuation of U.S. application Ser. No. 13/037,906 entitled "SYSTEM AND METHOD FOR HIGHLY DIRECTIONAL ELECTRONIC IDENTIFICATION AND COMMUNICATION AND COMBAT IDENTIFICATION SYSTEM EMPLOYING THE SAME," filed on Mar. 1, 2011, by Ralph Hayles, Jr., et al., which is currently pending and is a continuation of U.S. application Ser. No. 12/537,161, entitled "SYSTEM AND METHOD FOR POSITION OR RANGE ESTIMATION, TRACKING AND SELECTIVE INTERROGATION AND COMMUNICATION," filed on Aug. 6, 2009, by Ralph Hayles, Jr., et al., which issued as U.S. Pat. No. 8,378,922 and is a divisional of U.S. application Ser. No. 11/339,192, entitled "SYSTEM AND METHOD FOR POSITION OR RANGE ESTIMATION TRACKING AND SELECTIVE INTERROGATION AND COMMUNICATION," filed on Jan. 25, 2006, by Ralph E. Hayles, Jr., et al., which issued as U.S. Pat. No. 7,580,004 and claims benefit of U.S. Provisional Application Ser. No. 60/646,549, filed by Moryl, et al., on Jan. 25, 2005, entitled "INTERROGATION AND POSITION LOCATING SYSTEM." Each of the above non-provisional applications incorporate by reference U.S. application Ser. No. 10/972,958, filed by Hayles, et al., on Oct. 25, 2004, entitled "System and Method for Highly Directional Electronic Identification and Communication and Combat Identification System Employing the Same," which issued as U.S. Pat. No. 7,196,655. The present application also incorporates by reference U.S. application Ser. No. 10/972,958, which issued as U.S. Pat. No. 7,196,655, and each of the other above applications.

TECHNICAL FIELD

The present invention relates to, in general, wireless identification and communication systems and, more specifically, to a system and method for highly directional electronic identification and communication and a combat identification system employing the same.

BACKGROUND

Wireless identification and communication systems are a vital technology in today's world. Most such systems are omnidirectional; their antennas broadcast signals fairly uniformly in all directions. Omnidirectional communication systems are desirable in many applications, because their antennas need not be steered to maintain communication. They can serve broader territories, too.

However, some applications benefit from directional communication systems. Compared to omnidirectional communication systems, directional communication systems use antennas that transmit signals predominantly to, or receive signals predominantly from, a relatively narrow span of directions. Directional communication systems have some distinct advantages. First, since they focus the power they transmit onto a relatively narrow span of directions, they require less power than omnidirectional systems or alternatively are able to transmit farther than omnidirectional systems using the same power. Second, signal interception by an unauthorized third party is less likely, since the third party must be aligned with the transmitting antenna in order to receive the signal.

Secure and reliable wireless communication is particularly important in the context of combat. Such communication may merely involve identification. Split-second firing decisions are based on target identification. Knowing that a potential target is a friendly unit and not an enemy is critically important in order to avoid fratricide (so-called "friendly fire incidents").

Full communication between elements of a force is important. However, conventional battlefield communication systems are bulky and thus difficult to transport. Mobility is a key attribute of a modern fighting force. Therefore, a more transportable communication system would be highly advantageous.

SUMMARY

In one aspect, the disclosure provides an antenna for directional electronic communication. In one embodiment, the antenna includes: (1) a protective shell, (2) a Luneberg lens located within the protective shell and (3) multiple radio frequency signal conveyors located proximate a portion of the Luneberg lens and configured with the Luneberg lens to transmit radio frequency signals within a defined region or receive radio frequency signals that originate within the defined region.

In another aspect, the disclosure provides a directional communication system. In one embodiment, the directional communication system includes: (1) a base station having an antenna including: an antenna for directional electronic communication, having: a protective shell, a Luneberg lens located within the protective shell and multiple radio frequency signal conveyors located proximate a portion of the Luneberg lens and configured with the Luneberg lens to transmit radio frequency signals within a defined region or receive radio frequency signals that originate within the defined region, and (2) a transceiver configured to receive signals from the antenna based on the defined region.

The foregoing has outlined preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

The disclosure provides a system and a method capable of highly directional electronic identification or communication. The disclosed system can be a compact, lightweight and energy-efficient system that is capable of being independent of any host weapon system and compatible with all types of communications systems, weapon systems or weapons, including field artillery, armored vehicles, attack aircraft, bombers, helicopters, unmanned aerial vehicles and combatant ships. The disclosed system can afford protection to the various weapon platforms as well as dismounted troops and wheeled vehicles.

For purposes of the present invention, "communication" is defined as passing information from one communication terminal to another. "Identification" is defined as ascertaining the position, direction or arc-position, range or identity of a terminal. Communication may or may not involve identification. Identification does involve communication, although perhaps to a limited extent.

Figure 1:
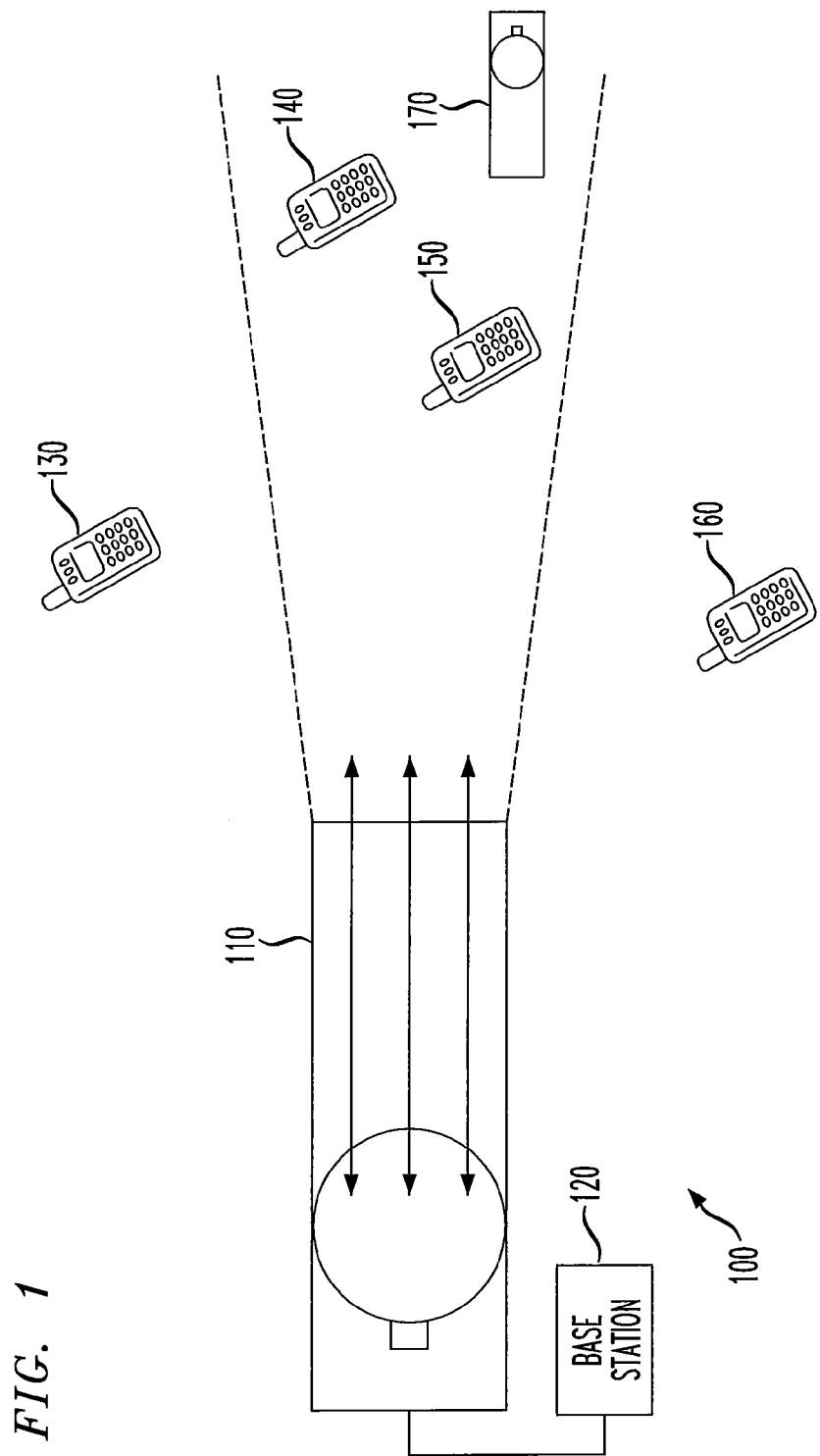
FIG. 1 illustrates a schematic view of one embodiment of a directional communication system constructed according to the principles of the present invention.

Referring initially to FIG. 1, illustrated is a schematic view of one embodiment of a directional communication system constructed according to the principles of the present invention. The directional communication system, generally designated 100, includes a directional antenna 110 and a base station 120. The directional antenna 110 is a directional antenna that transmits signals that travel out as a beam within a defined cone. The directional antenna 110 also receives signals that originate within the defined cone. The structure and function of the directional antenna 110 will be set forth in substantially greater detail in conjunction with FIG. 2.

The base station 120 may be analog or digital, capable of transmitting or receiving on any operating frequency or band of frequencies suitable to a Luneberg lens and capable of transmitting at any suitable power level. Those skilled in the pertinent art will understand that a wide array of base station topologies is within the broad scope of the present invention. The base station 120 may be housed within the directional antenna 110.

A plurality of transceivers 130, 140, 150, 160 (which, in the illustrated embodiment, are omnidirectional) are configured to receive signals from the antenna based on a direction relative thereto. In the illustrated embodiment, the plurality of transceivers 130, 140, 150, 160 assume the general shape, size and weight of a common cellphone, although this certainly need not be the case.

In the specific example illustrated in FIG. 1, the transceivers 140, 150 are within the defined cone within which the directional antenna 110 projects its beam and within which the directional antenna 110 is capable of receiving signals. Thus, the transceivers 140, 150 are capable of communicating with the base station 120 via the directional antenna 110. In contrast, the transceivers 130, 160 are outside of the defined cone and therefore not in direction to communicate with the base station 120. The ability of the directional communication system 100 to communicate selectively with the plurality of transceivers 120, 130, 140, 150 is valuable in certain applications, which will be highlighted in the discussion that follows.

FIG. 1 also shows a second directional antenna 170. The second directional antenna is located within the defined cone of the directional antenna 110. When the second directional antenna 170 is oriented such that the directional antenna 110 is within its defined cone, the two directional antennas can communicate with one another directionally. The result is a point-to-point communication system that excludes receivers located outside the defined cones of the directional antenna 110 and the second directional antenna 170 from intercepting both ends of any communication taking place therebetween. Such system is afforded a certain level of security solely by reason of its directionality.

Figure 2:
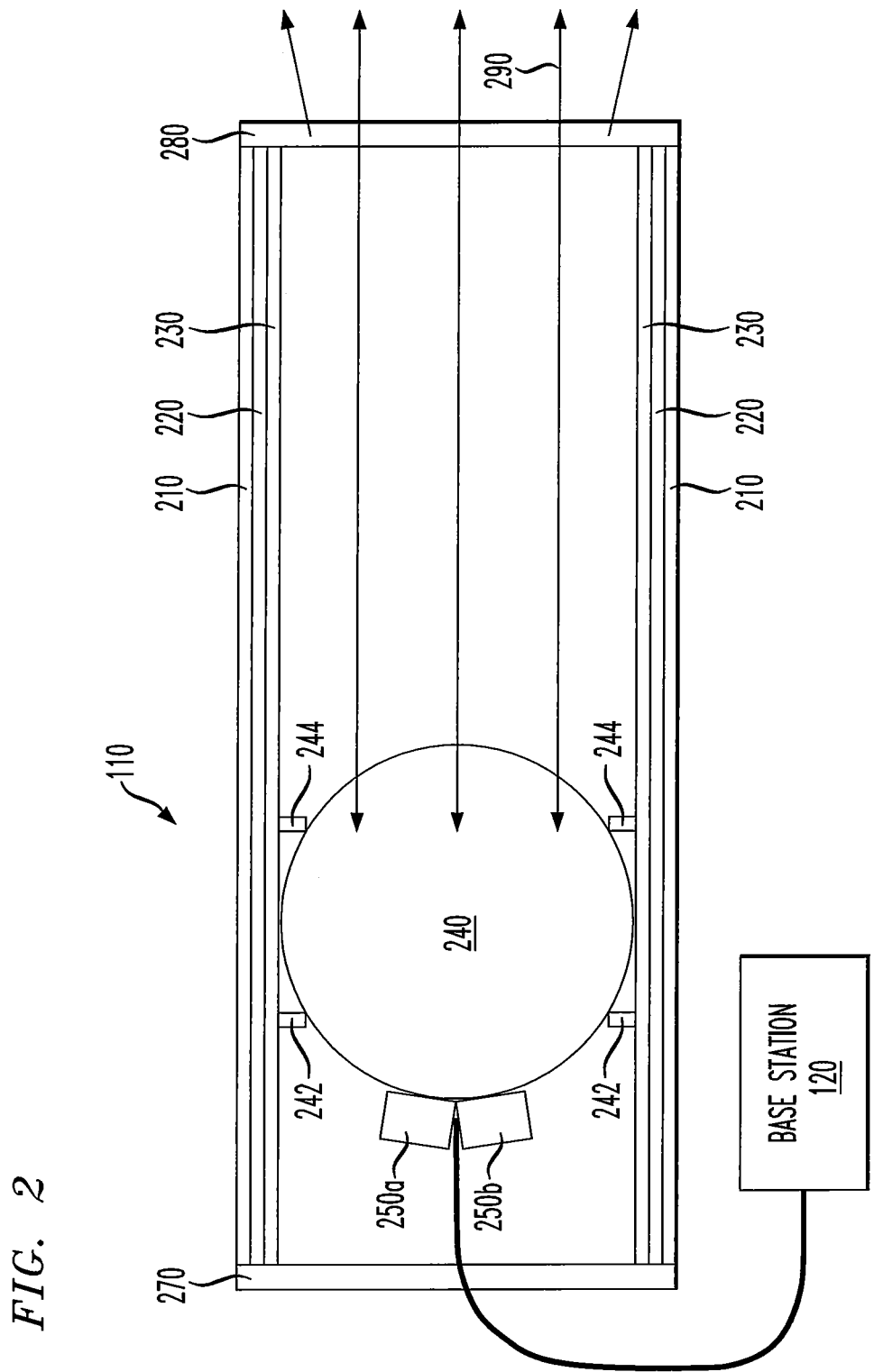
FIG. 2 illustrates a schematic sectional view of one embodiment of a directional antenna constructed according to the principles of the present invention and that can be employed in the system of FIG. 1.

Turning now to FIG. 2, illustrated is a schematic sectional view of one embodiment of a directional antenna 110 constructed according to the principles of the present invention and that can be employed in the directional communication system 100 of FIG. 1. The directional antenna 110, which can transmit and receive low power, communications signals with substantial gain, can be used to restrict communications to devices physically located within the narrow sector at which the antenna is aimed. The beamwidth of the transmitted signal can be established to specific dimensions according to the application of the system in which it is employed.

As will be seen, the directional antenna 110 can be used as an interrogation component of a combat identification system in which friendly forces are equipped with omnidirectional transponder or transceiver units designed to function at or near the frequency employed by the interrogation unit. The directional antenna 110 may be aligned with the sight of a direct fire weapons system and transmit therefrom an interrogation signal at a potential target. The transponders of any friendly forces receiving the interrogation signal would respond with a signal identifying themselves as friendly forces and perhaps disable the weapon system from firing, perhaps subject to manual override.

The directional antenna 110 can alternatively be used as a component of a highly focused radar system capable of directing a radar pulse at a specific object. The directional antenna 110 can further alternatively be used as part of a secure point-to-point communications system in which the transmissions will only be detectable by receivers, transceivers or sensors in the direction at which the antenna is aimed.

The directional antenna 110 includes a protective shell 210, which may advantageously be substantially dielectric. Located radially inward of the protective shell 210 may be a conductive shield 220, which may be made of copper. In the illustrated embodiment, the protective shell 210 substantially supports the conductive shield 220, although the conductive shield 220 may be sufficiently thick to be self-supporting. Located radially inward of the conductive shield 220 in the illustrated embodiment is a layer of radio frequency absorptive material 230. The radio frequency absorptive material 230 may be a conductive foam (typically a carbon-coated foam), which is commercially available from, for example, R&F Products of San Marcos, Calif. In the embodiment illustrated in FIG. 2, the protective shell 210, the conductive shield 220 and the radio frequency absorptive material 230 take the form of open-ended concentric cylinders.

In the illustrated embodiment, the radio frequency absorptive material 230 and the conductive shield 220 are longitudinally coextensive, meaning that the radio frequency absorptive material 230 fully covers the inner surface of the conductive shield 220, but does not extend beyond it. Of course, this need not be the case. For example, the absorptive material may not fully cover the inner surface. In some embodiments, the directional antenna 110 may not include the absorptive material 230.

A Luneberg lens 240 is located radially inward of the radio frequency absorptive material 230. Those skilled in the pertinent art understand that a Luneberg lens is a generally spherical structure composed of layers of materials having different dielectric constants. A Luneberg lens functions to cause diverging radio frequency signals to collimate or to cause collimated radio frequency signals to converge. For a general discussion of Luneberg lenses, see, e.g., http://stewks.ece.stevens-tech.edu/luneberg.dir/Report2.apr99/luneberg-apr99.pdf.

One or more radio frequency signal conveyors are located proximate the Luneberg lens 240. In FIG. 2, the radio frequency signal conveyors are feed horns (actually two feed horns 250a, 250b in the embodiment of FIG. 2) that are located proximate the Luneberg lens 240. In the context of FIG. 2, the Luneberg lens 240 functions substantially to collimate diverging radio frequency signals transmitted from the feed horns 250a, 250b and further to cause substantially collimated radio frequency signals received into the directional antenna 110 to converge on the feed horns 250a, 250b.

A transmission line 260 couples the feed horns 250a, 250b to the base station 120. A pair of retainer rings 242, 244 cooperate to retain the Luneberg lens 240 within the directional antenna 110. One skilled in the art will understand that another means may be used to retain the Luneberg lens 240 within the directional antenna 110.

A rear end cap 270 and a dielectric front end cap 280 advantageously seal the interior of the directional antenna 110 as against environmental elements. The front end cap 280 covers a radiating opening of the directional antenna 110. Accordingly, FIG. 2 shows a plurality of collimated double-ended arrow lines extending from the Luneberg lens 240 and through the radiating opening of the directional antenna 110. The double-ended arrow lines represent radio frequency signals transmitted from or received into the directional antenna 110. The feed horns 250a, 250b are located proximate the portion of the Luneberg lens 240 that is distal from the radiating opening of the directional antenna 110.

In the illustrated embodiment of the directional antenna 110, an outer diameter of the protective shell 210 is at least five inches. In one specific embodiment, the outer diameter of the protective shell 210 is 6.650 inches, and it is about 15 inches long. Those skilled in the art will understand, however, that the broad scope of the present invention is not limited to particular dimensions of outer diameter or length.

In the illustrated embodiment of the directional antenna 110, the radio frequency absorptive material 230 has a thickness between about 0.1 inch and about one inch. More specifically, the radio frequency absorptive material 230 has a thickness of about 0.375 inch. Those skilled in the art will understand, however, that the broad scope of the present invention is not limited to particular thicknesses.

In the illustrated embodiment of the directional antenna 110, the antenna produces radio frequency signals having a carrier frequency of between about 4 GHz and about 30 GHz. In the embodiment of FIGS. 1 and 2, the carrier frequency is about 17 GHz. Those skilled in the art will understand, however, that the broad scope of the present invention is not limited to particular carrier frequencies.

In the illustrated embodiment, the radio frequency signals bear digital data. Those skilled in the pertinent art understand that digital communication has some substantial advantages over analog communication, particularly when secure communication (often by means of encryption) is desired. The present invention is not, however, limited to communication of digital data.

In the illustrated embodiment, the conductive shield 220 (which, again, may be copper) has a thickness less than about 0.1 inch. Those skilled in the art will understand, however, that the conductive shield may be thicker or thinner as a particular application may find advantageous.

In the illustrated embodiment, the Luneberg lens 240 has a diameter between about four inches and about eight inches. Those skilled in the art will understand, however, that the broad scope of the present invention is not limited to particular diameters.

The antenna may have a 3 decibel (dB) beamwidth of about 7° and a null-to-null beamwidth of about 14°. The diameter of the Luneberg lens 240 and the distance of the Luneberg lens 240 from the radiating opening of the directional antenna 110 may be adjusted to provide different beamwidths. Those skilled in the art will understand that the broad scope of the present invention is not limited to particular beamwidths.

Figure 3:
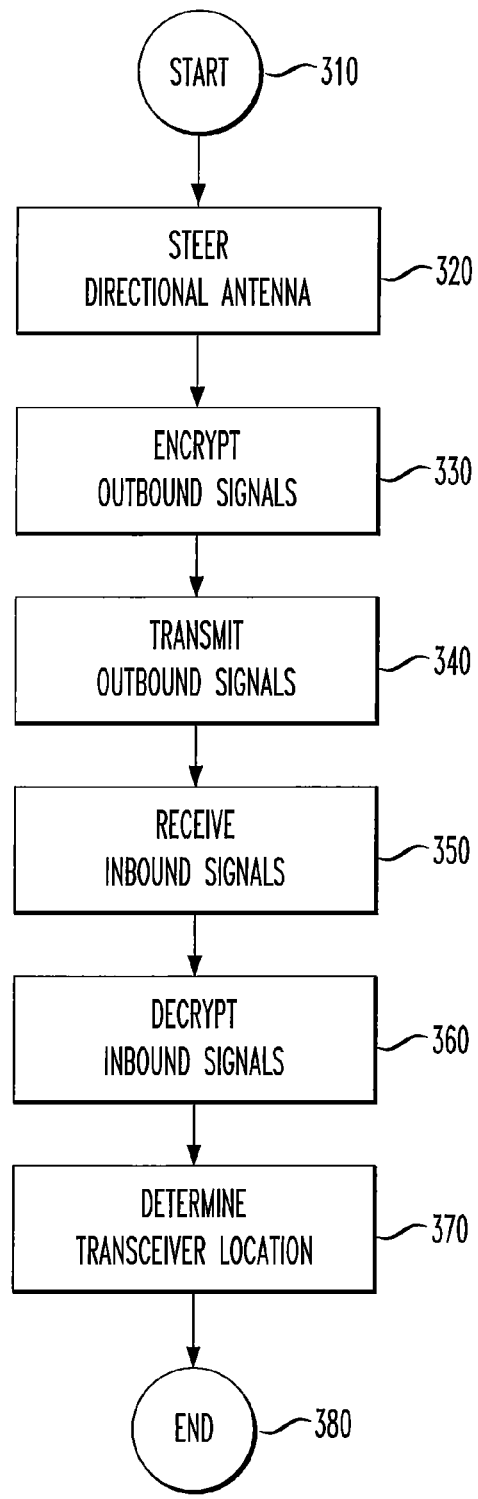
FIG. 3 illustrates a flow diagram of one embodiment of a method of conducting directional communication carried out according to the principles of the present invention.

Turning now to FIG. 3, illustrated is a flow diagram of one embodiment of a method of effecting highly directional electronic identification or communication carried out according to the principles of the present invention. The method starts in a start step 310 wherein directional communication is desired to be undertaken.

The method 310 proceeds to a step 320 in which the directional antenna is steered in a desired direction. Next, in a step 330, information to be transmitted ("outbound signals") is optionally encrypted and modulated to yield a radio frequency signal. That modulation may be, for example, binary phase-shift keying (BPSK). In a step 340, the outbound signals so modulated are applied to the directional antenna and transmitted thereby, perhaps as a circularly polarized radio frequency signal.

In a step 350, inbound signals emanating from a transceiver that is within the defined cone of the directional antenna are received thereby. In a step 360, the inbound signals are demodulated and optionally decrypted to retrieve the information they contain. Further, the radial direction of the transceiver may be determined in a step 370 by noting the direction in which the directional antenna is pointing; the transceiver is within the defined cone of the antenna's beamwidth. The transceiver's direction may be further discriminated with reference to which of the various radio frequency signal conveyors (e.g., feed horns) is receiving a transmission from the transceiver. The transceiver's direction may also be further discriminated by steering the antenna through an arc while receiving a transmission from the transceiver and noting the angles when the transmission can be received versus those when the transmission is lost. The method ends in an end step 380.

Figure 4:
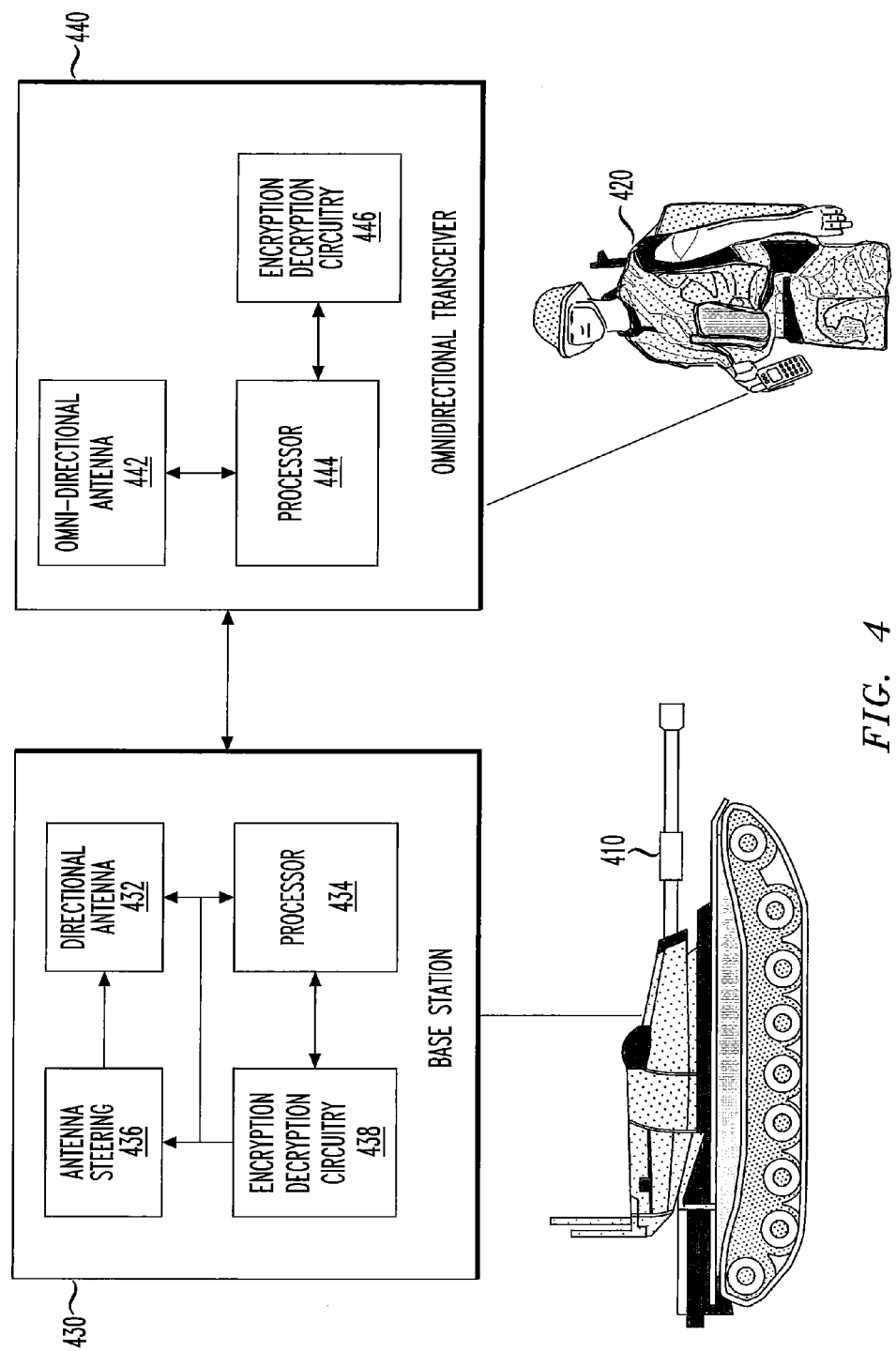
FIG. 4 illustrates a schematic view of one embodiment of a combat identification system constructed according to the principles of the present invention.

Turning now to FIG. 4, illustrated is a schematic view of one embodiment of a combat identification system constructed according to the principles of the present invention. The combat identification system is illustrated as operating in the context of an exemplary combat environment that includes a large, ground-based weapon system 410 (a main battle tank) and a common foot soldier 420 that is subject to becoming a casualty by means of the weapon system 410.

The illustrated embodiment of the combat identification system has two components: a base station 430 and an omni-directional transceiver 440 that assumes the general shape, size and weight of a common cellphone.

The base station 430 includes a directional antenna 432, a processor 434, an antenna steering mechanism or circuit 436 and encryption/decryption circuitry 438. The directional antenna 432 includes a conductive shield having an opening at an end thereof, a Luneberg lens located within the conductive shield and a radio frequency signal conveyor located proximate a portion of the Luneberg lens that is distal from the opening. Thus, the directional antenna may be of the general type illustrated in FIGS. 1 and 2.

The processor 434 controls the overall operation of the base station 430 and may be of any conventional or later-developed type. The processor 434 may be capable of creating a secure execution environment (SEE), advantageous for processing secure data. The antenna steering mechanism or circuit 436 may be dedicated hardware, software executable in the processor 434, a combination thereof or may advantageously be embodied by mounting the directional antenna to the turret of the weapon system 410, preferably such that the directional antenna is generally parallel with the main gun barrel. The encryption/decryption circuitry 438 may be dedicated hardware, software executable in the processor 434 or a combination thereof.

As stated above, the omnidirectional transceiver 420 may assume the physical form of a common cellphone; and, in fact, FIG. 4 indicates such form. The omnidirectional transceiver 420 includes an omnidirectional antenna 442 (e.g., such as may be found on any common cellphone), a processor 444 and encryption/decryption circuitry 446. The processor 444 controls the overall operation of the omnidirectional transceiver 440 and may be of any conventional or later-developed type. The processor 444 may be capable of creating an SEE. The encryption/decryption circuitry 446 may be dedicated hardware, software executable in the processor 444 or a combination thereof.

During operation, the illustrated embodiment of the combat identification system operates by trading secure information. In general, the base station 430 is configured to transmit a combat identification interrogation signal, perhaps only about 2 milliseconds (ms) in duration. Assuming the omnidirectional transceiver 440 is within the defined cone of the directional antenna 432, the omnidirectional transceiver 440 responds to the combat identification interrogation signal with a secure identification signal, again perhaps only 2 ms in duration. Upon receiving and verifying the validity of the secure identification signal, the base station 430 can optionally determine the radial direction of the omnidirectional transceiver 440 (as indicated by the direction of the directional antenna 432), the specific identity of the omnidirectional transceiver based on the data received in the response signal and the range between the base station 530 and the omnidirectional transceiver based on the time delay between the transmission of the interrogation signal and the receipt of the response. The base station could, as one possible further measure, prevent the weapon system 410 from being able to fire, probably subject to manual override. The foot soldier 420 is thereby automatically shielded from an additional battlefield hazard.

Figure 5:
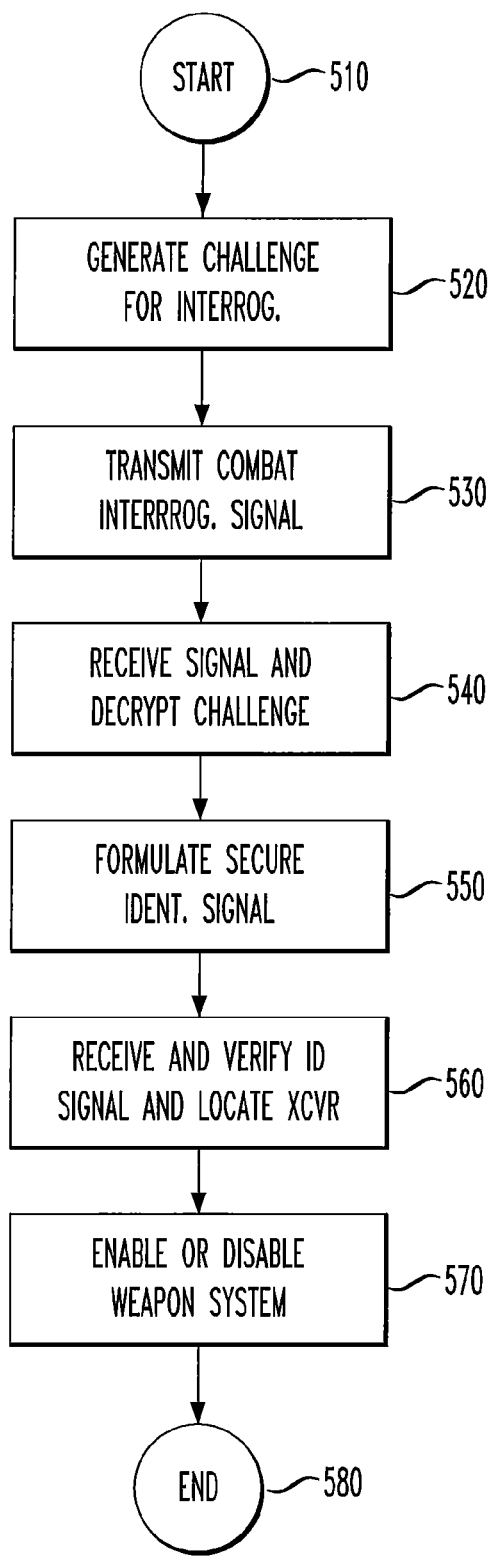
FIG. 5 illustrates a flow diagram of one embodiment of a method of identifying friendly forces carried out according to the principles of the present invention.

Turning now to FIG. 5, illustrated is a flow diagram of one embodiment of a method of identifying friendly forces carried out according to the principles of the present invention. The method begins in a start step 510, wherein combat identification is desired.

The method proceeds to a step 520 in which a challenge, in the form of a combat identification interrogation signal, is generated and optionally encrypted in the base station. The challenge is advantageously based on a code to which only friendly forces would have access and that is in all likelihood frequently changed to avoid compromise.

The combat identification interrogation signal is transmitted directionally via the directional antenna in a step 530. Omnidirectional transceivers that are in the defined cone of transmission receive the transmitted signal and decrypt it in a step 540. Unauthorized (enemy) receivers or transceivers that are in the defined cone of transmission may intercept the combat identification interrogation signal, but should not be able either to understand or respond suitably to it. Any omnidirectional transceivers or unauthorized receivers or transceivers outside of the defined cone are unable to receive and therefore understand or respond to the combat identification interrogation signal.

Next, in a step 550, the omnidirectional transceivers that received the combat identification interrogation signal formulate and transmit a suitable response, that is a secure identification signal. In the illustrated embodiment, each of the omnidirectional transceivers has a unique identification code that may advantageously be used in formulating its secure identification signal.

Then, in a step 560, the base station receives and verifies the secure identification signals it may receive and may establish the radial direction, and display the range and specific identity of the omnidirectional transceivers based thereon. In an optional step 570, the base station may enable or disable the weapon system's ability to fire based on the secure identification signals it has received and verified. The method ends in an end step 580.

Although the present invention has been described in detail, those skilled in the art should understand that they can make various changes, substitutions and alterations herein without departing from the spirit and scope of the invention in its broadest form.

What is claimed is:

1. A weapon, comprising:
a gun barrel or an aiming device; and
an antenna mounted in alignment with said gun barrel or said aiming device, said antenna including:
 a protective shell,
 a Luneberg lens located within said protective shell, and
 multiple radio frequency signal conveyors located proximate a portion of said Luneberg lens and configured with said Luneberg lens to transmit radio frequency signals within a defined region or receive radio frequency signals that originate within said defined region.

2. The weapon as recited in claim 1 wherein said multiple radio frequency signal conveyors are configured with said Luneberg lens to transmit radio frequency signals within said defined region and receive radio frequency signals that originate within said defined region.

3. The weapon as recited in claim 2 wherein said multiple radio frequency signal conveyors are configured with said Luneberg lens to exclude transmit radio frequency signals to receivers outside said defined region and receive radio frequency signals that originate outside of said defined region.

4. The weapon as recited in claim 1 wherein said defined region is a beam defined by said multiple radio frequency conveyors and said Luneberg lens.

5. The weapon as recited in claim 1 wherein said antenna transmits a radar pulse within said defined region.

6. The weapon as recited in claim 1 wherein said Luneberg lens is configured to collimate diverging radio frequency signals from said radio frequency signal conveyors for transmission within said defined region and cause substantially collimated radio frequencies signals received from said defined region to converge on said radio frequency signal conveyors.

7. The weapon as recited in claim 1 wherein said antenna transmits an interrogation signal within said defined region.

8. The weapon as recited in claim 1 wherein said antenna is mounted in parallel with said gun barrel or said aiming device, wherein said gun barrel or said aiming device are employed to direct operation of said weapon at a target.

9. The weapon as recited in claim 1 further comprising a base station including encryption/decryption circuitry coupled to said antenna.

10. A directional antenna system for directional electronic communication, comprising:
   an aiming device; and
   an antenna mounted in alignment with said aiming device, said antenna including:
      a protective shell,
      a Luneberg lens located within said protective shell, and
      multiple radio frequency signal conveyors located proximate a portion of said Luneberg lens and configured with said Luneberg lens to transmit radio frequency signals within a defined region or receive radio frequency signals that originate within said defined region.

11. The directional antenna as recited in claim 10 wherein said transmit radio frequency signals or said receive radio frequency signals bear digital data.

12. The directional antenna as recited in claim 10 wherein said directional antenna is configured to communicate with a second directional antenna to form a point- to-point communication link.

* * * * *